United States Patent
Mennig et al.

(10) Patent No.: US 7,748,412 B2
(45) Date of Patent: Jul. 6, 2010

(54) HOSE HAVING A SINGLE REINFORCING LAYER

(75) Inventors: Gary Mennig, Beaver Dam, WI (US); John Wendt, Cottage Grove, WI (US); Brian Henry, Sun Prairie, WI (US)

(73) Assignee: Veyance Technologies Inc., Fairlawn, OH (US)

( * ) Notice: Subject to any disclaimer, the term of this patent is extended or adjusted under 35 U.S.C. 154(b) by 0 days.

(21) Appl. No.: 12/186,178

(22) Filed: Aug. 5, 2008

(65) Prior Publication Data

US 2010/0032047 A1 Feb. 11, 2010

(51) Int. Cl.
*F16L 11/00* (2006.01)

(52) U.S. Cl. .................. 138/124; 138/123; 138/125; 138/126

(58) Field of Classification Search ......... 138/123–127, 138/130, 172, 133, 138, 143
See application file for complete search history.

(56) References Cited

U.S. PATENT DOCUMENTS

| | | | | |
|---|---|---|---|---|
| 3,011,525 A | 12/1961 | Charles et al. | ............. | 138/126 |
| 3,725,167 A | 4/1973 | Hunt et al. | ............. | 156/143 |
| 3,750,712 A | 8/1973 | Brand | ............. | 138/124 |
| 3,856,052 A | 12/1974 | Feucht | ............. | 138/119 |
| 4,111,237 A | 9/1978 | Mutzner et al. | ............. | 138/125 |
| 4,266,461 A | 5/1981 | Molitors | ............. | 87/29 |
| 4,273,160 A | 6/1981 | Lowles | ............. | 138/124 |
| 4,420,018 A | 12/1983 | Brown | ............. | 138/124 |
| 4,431,031 A | 2/1984 | Ettlinger | ............. | 138/109 |
| 4,553,568 A | 11/1985 | Piccoli et al. | ............. | 138/125 |
| 4,585,035 A | 4/1986 | Piccoli | ............. | 138/127 |
| 4,604,155 A | 8/1986 | McKiernan | ............. | 156/287 |
| 4,662,405 A | 5/1987 | Besche et al. | ............. | 138/125 |
| 4,699,178 A * | 10/1987 | Washkewicz et al. | ............. | 138/125 |
| 4,754,685 A | 7/1988 | Kite et al. | ............. | 87/9 |
| 4,802,510 A | 2/1989 | Berlincourt et al. | ............. | 138/125 |
| 4,907,624 A | 3/1990 | Jonasson | ............. | 138/125 |
| 4,952,262 A | 8/1990 | Washkewicz et al. | ............. | 156/149 |
| 5,099,744 A | 3/1992 | Hurst et al. | ............. | 87/45 |
| 5,268,134 A | 12/1993 | Burlett et al. | ............. | 264/209.6 |
| 5,445,191 A | 8/1995 | Green et al. | ............. | 138/126 |
| 5,775,195 A | 7/1998 | Haehnel et al. | ............. | 87/44 |
| 5,803,129 A | 9/1998 | Coronado et al. | ............. | 138/125 |
| 6,068,026 A * | 5/2000 | Garois | ............. | 138/126 |
| 6,179,007 B1 | 1/2001 | Cote | ............. | 138/106 |
| 6,450,206 B2 | 9/2002 | Ishikawa et al. | ............. | 138/126 |
| 6,648,023 B2 | 11/2003 | Nakakita et al. | ............. | 138/127 |

(Continued)

FOREIGN PATENT DOCUMENTS

EP 0696700 A1 2/1996

OTHER PUBLICATIONS

SAE International, "Surface Vehicle Standard", technical standards report, revised Jun. 2003, 18 pages.

*Primary Examiner*—Patrick F Brinson (57) ABSTRACT

In one embodiment, a hose is provided which includes a tubular inner core layer and a tubular outer layer. A single reinforcing layer is disposed between the tubular inner core layer and the tubular outer layer and is formed strands having a 1-over, 1-under braid pattern, a 3-over, 3-under braid pattern, or a 4-over, 4-under braid pattern. The strands define a coverage of the tubular inner core layer of at least about 75%.

2 Claims, 5 Drawing Sheets

U.S. PATENT DOCUMENTS

| | | | |
|---|---|---|---|
| 6,926,038 B1 | 8/2005 | Cook et al. | 138/127 |
| 6,978,805 B2 | 12/2005 | D'Amico | 138/125 |
| 6,988,515 B2 | 1/2006 | Oishi et al. | 138/143 |
| 7,021,339 B2 * | 4/2006 | Hagiwara et al. | 138/123 |
| 2005/0136203 A1 | 6/2005 | Henry | 428/36.2 |
| 2008/0210328 A1 | 9/2008 | Henry | 138/126 |

* cited by examiner

HOSE HAVING A SINGLE REINFORCING LAYER

TECHNICAL FIELD

The present invention relates generally to hoses, and more particularly to braided, reinforced hoses.

BACKGROUND

Reinforced hoses are well known in industry for use in transporting fluids such as pressurized brake fluids or air conditioning fluids. Known hoses may include a polymeric inner core layer and one or more reinforcing layers formed from strands of fiber or wire material that are braided over the core layer. Some of these known hoses, for example, may include two or three reinforcing layers. Known hoses also include one or more intermediate hose layers formed over the core hose layer. Known hoses, moreover, include a polymeric cover or outer layer that defines the exterior of a hose.

Known hoses may have layers of reinforcing material applied in a 2-over, 2-under braid pattern i.e., with strands that are successively passed over and under pairs of oppositely wound strands. Hoses of this type may meet certain performance criteria (e.g., volumetric expansion, flexibility, dynamic life, etc.) for particular applications, although there remains room for improvement, for example, to optimize some of these performance criteria.

SUMMARY

In one embodiment, a hose for transporting a fluid is provided which includes a tubular inner core layer defining a lumen configured for transport of the fluid, a tubular outer layer, and a single reinforcing layer disposed between the tubular inner core layer and the tubular outer layer. The single reinforcing layer is formed of strands having a 1-over, 1-under braid pattern, a 3-over, 3-under braid pattern, or a 4-over, 4-under braid pattern, with the strands defining a coverage of the inner core layer of at least about 75%. The single reinforcing layer may define a total reinforcement not greater than about 144,000 denier. The strands of the braid pattern may be made of polyester material, such as, without limitation, polyethylene terephthalate (PET). The strands may be additional or alternatively coated with at least one of resorcinol formaldehyde latex adhesive or an isocyanate adhesive.

The strands may be made of a material having a denier value of about 1500. The tubular inner core layer may be composed of at least one of nylon or chlorobutyl rubber. The tubular outer layer may composed of ethylene propylene diene monomer rubber. The hose may have a flexibility associated with a bending force of about 0.65 kg when the hose is bent about a semi-circular surface having a radius of about 90 mm following a natural curve of the hose. Alternatively or additionally, the hose may have a flexibility associated with a bending force of about 1.2 kg when the hose is bent about a semi-circular surface having a radius of about 90 mm the bending being against a natural curve of the hose. The braid pattern may include strands made of wire. The inner core layer may be made of a polymer or plastic.

The lumen of the tubular inner core layer may have a diameter of about ¼ inch, with the hose having a volumetric expansion not greater than about 0.13 cc/ft with 1000 psi of fluid pressure within the lumen. The lumen of the tubular inner core layer may alternatively have a diameter in the range of about 11.5 mm to about 12.5 mm. The tubular outer layer may have an outer diameter in the range of about 17.5 mm to about 19.5 mm. The tubular inner core layer may have a thickness in the range of about 0.076 mm to about 0.152 mm. The hose may further include an intermediate layer that is disposed between the tubular inner core layer and the single reinforcing layer with the intermediate layer having a thickness in the range of about 0.76 mm to about 1.0 mm. The hose may include an intermediate layer that is disposed between the tubular inner core layer and the single reinforcing layer with the intermediate layer being composed of a bromo-butyl rubber material extruded over the inner core layer. The tubular outer layer may have a thickness in the range of about 1.2 mm to about 1.5 mm. The tubular inner core layer may be comprised of an extruded non-plasticized polyamide material.

In another embodiment, a hose is provided that includes a tubular inner core layer defining a lumen with a diameter of about ¼ inch, a tubular outer layer and a single reinforcing layer disposed between the tubular inner core layer and tubular outer layer. The single reinforcing layer is formed of strands having a 3-over, 3-under braid pattern, with the hose having a volumetric expansion not greater than about 0.13 cc/ft, not greater than about 0.18 cc/ft, and not greater than about 0.29 cc/ft, respectively with about 1000 psi, about 1500 psi, and about 2900 psi of fluid pressure within the lumen.

In yet another embodiment, a hose is provided that includes a tubular inner core layer defining a lumen with a diameter of about 3/16 inch, a tubular outer layer and a single reinforcing layer disposed between the tubular inner core layer and tubular outer layer. The single reinforcing layer is formed of strands having a 3-over, 3-under braid pattern, with the hose having a volumetric expansion not greater than about 0.10 cc/ft, not greater than about 0.12 cc/ft, and not greater than about 0.22 cc/ft, respectively with about 1000 psi, about 1500 psi, and about 2900 psi of pressure within the lumen.

DETAILED DESCRIPTION

Figure 1:
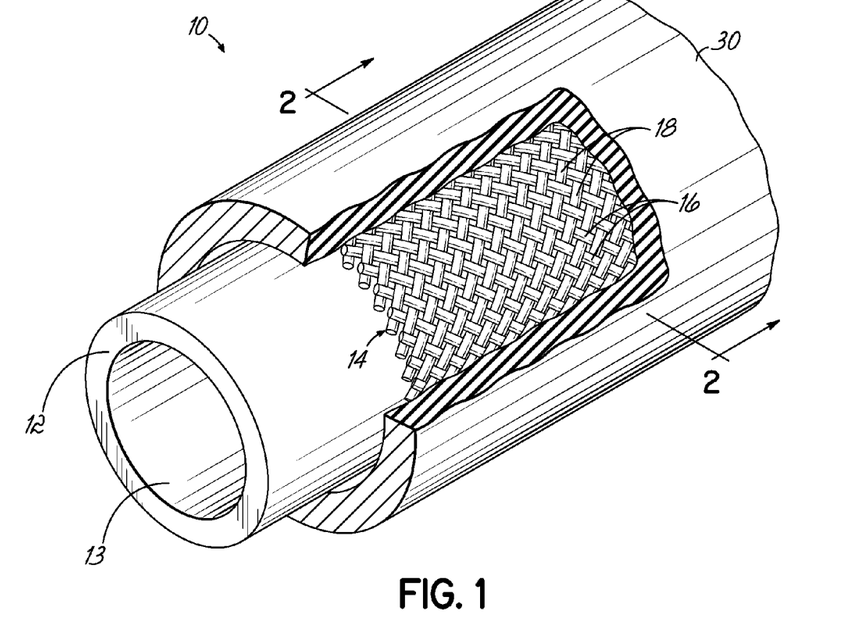
FIG. 1 is a partially broken away perspective view depicting an exemplary embodiment of a hose.
Figure 2:
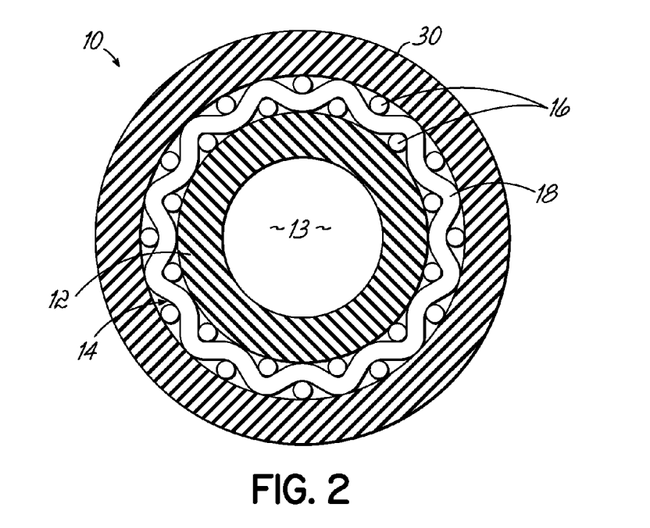
FIG. 2 is a cross-sectional view taken generally along line 2-2 of FIG. 1.

Referring to FIGS. 1 and 2, an exemplary hose 10 includes an inner core layer or tube 12 defining a lumen 13 configured to transport a fluid such as brake fluid, air conditioning fluid, or others in, for example, an automobile, a motorcycle, or other types of vehicles. The dimensions of lumen 13 are suitably chosen for a specific application. For example, and without limitation, lumen 13 may have a diameter in the range from about 11.5 mm to about 12.5 mm.

Inner core layer 12 is formed from a plastic, from an extruded non-plasticized polyamide material, or from a generally polymeric material that is suitable for use in transporting a fluid material for which the hose 10 is intended to be used. As non-limiting examples, the material may include polychloroprene, chlorinated polyethylene acrylonitrile-budtadiene, styrene butadiene, polyisoprene, polybutadiene, ethylene-propylene-diene terpolymers, chlorinated polyethylene, nylon, chlorobutyl rubber, ethylene-propylene diene monomer rubber or another rubber polymer. Alternatively, the polymeric material may comprise thermoplastic elastomers such as propylene modified with ethylene-propylene rubber, such as Santoprene®, available from Monsanto Corporation; block polymers, such as the Kraton® line of polymers available from Shell Chemical Company; polyvinyl chloride, etc. These elastomers may be compounded with other filler, plasticizers, antioxidants, and cure systems to achieve particular properties desired for a given application, as known in the art. The thickness of inner core layer 12 is suitably chosen for a specific application. For example, and without limitation, inner core layer 12 may have a thickness in the range from about 0.76 mm to about 1.0 mm.

A single reinforcing layer 14 is formed over the inner core layer 12 and includes a plurality of first and second reinforcing members 16, 18 wound in directions opposite one another about and along the length of the inner core layer 12 in a braided pattern, for example, by a rotary braiding machine. The reinforcing members 16, 18 may include strands of fiber material, such as cotton, rayon, polyester, polyvinyl alcohol, or other suitable fiber material. Each strand may further include a group or bundle of individual threads or filaments. In a non-limiting example, the strands may be made of a polyethylene terephthalate material. Alternatively, the reinforcing members 16, 18 may include strands of metallic material in the form of wire. The material defining the strands of reinforcing members 16, 18, moreover, may have denier values from about 1500 to about 2000.

In the embodiment shown in FIG. 1, the first and second reinforcing members 16, 18 of the single reinforcing layer 14 are braided in a pattern such that each first reinforcing member 16 crosses over an oppositely wound second reinforcing member 18, and then passes under an adjacent, oppositely wound reinforcing member 18 in succession. This braid pattern is referred to herein as a 1-over, 1-under braid pattern. The first and second reinforcing members 16, 18 may be wound, for example, using strands having denier values of about 1500, with four ends and 24 carriers of the rotary braiding machine to thereby define a total reinforcement provided by the single reinforcing layer 14 of about 144,000 denier. Other combinations of strand denier value, number of ends and number of carriers are alternatively contemplated to yield a single reinforcing layer 14 providing a total reinforcement not greater than about 144,000. The resulting braid pattern of single reinforcement layer 14 may yield a total coverage of the underlying surface (e.g., the inner core layer 12) in the range of about 75% to about 100%.

The specific arrangement of the strands of the first and second reinforcing members 16, 18 in a 1-over, 1-under braid pattern permits formation of a single reinforcing layer 14 that has a substantially smooth appearance. This smooth appearance, in turn, yields a smooth appearance of the hose 10. Moreover, the specific arrangement prevents or at least minimizes bleed-through of any adjacent layers of the hose 10 through single reinforcing layer 14. For example, the chosen arrangement of single reinforcing layer 14 may prevent or minimize bleed-through of a rubber-based material extruded over single reinforcing layer 14. The chosen arrangement, moreover, determines other properties such as the amount of flexibility of the resulting hose 10.

The hose 10 may further include an outer layer 30 formed over the single reinforcing layer 14, for example, by extruding the outer layer 30 over the single reinforcing layer 14. The outer layer 30 protects the hose 10 and is formed from a material suited for use in an application for which the hose 10 will be used. As a non-limiting example, the outer layer 30 may be formed from any of the various materials described above for the inner core layer 12. The thickness of outer layer 30 is suitably chosen for a specific application. For example, and without limitation, outer layer 30 may have a thickness in the range from about 1.2 mm to about 1.5 mm. The thickness of outer layer 30, along with the dimensions of the inner core layer 12 and those of single reinforcing layer 14, defines an outer diameter of the outer layer 30. For example, and without limitation, outer layer 30 may have an outer diameter in the range from about 11.5 mm to about 12.5 mm.

Figure 3:
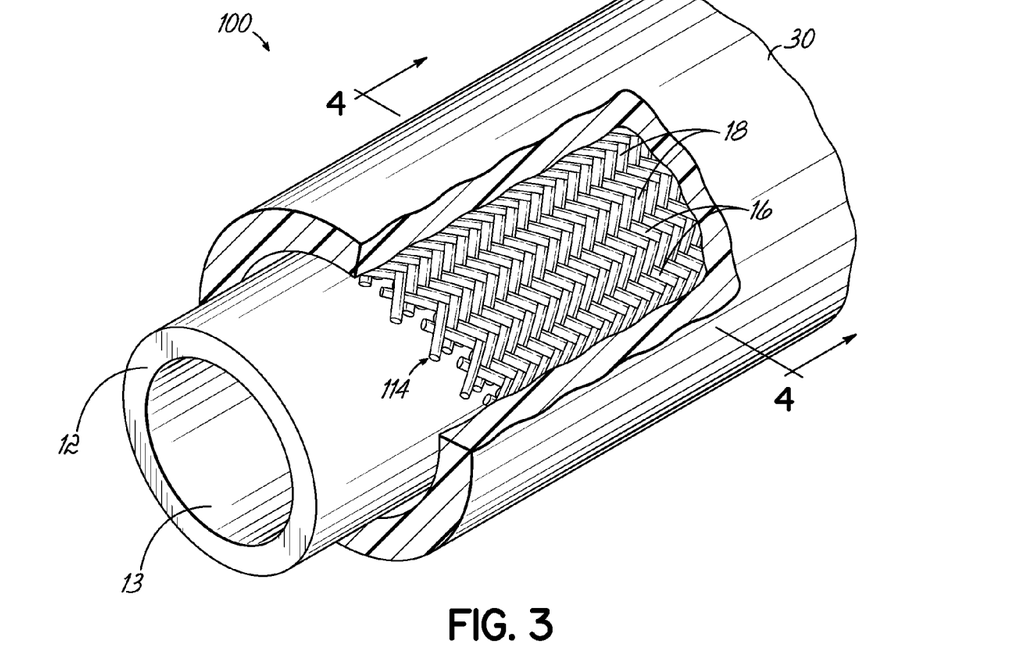
FIG. 3 is a partially broken away perspective view depicting another exemplary embodiment of a hose.
Figure 4:
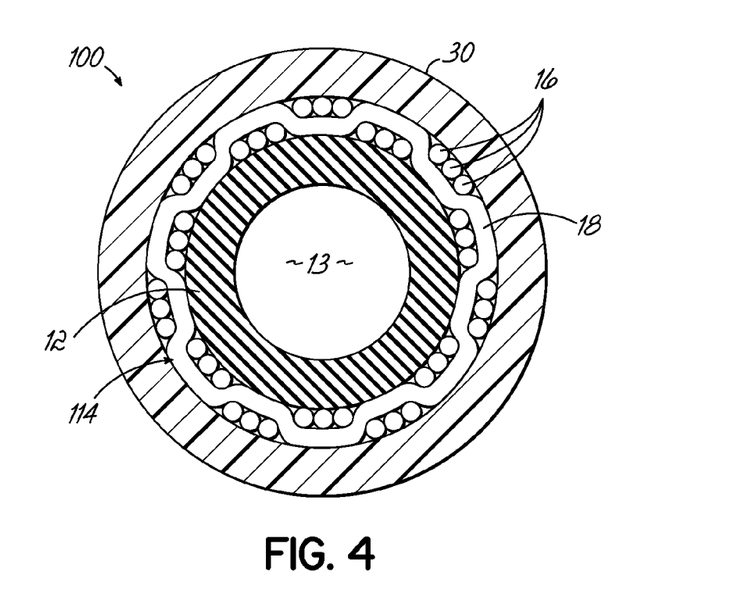
FIG. 4 is a cross-sectional view taken generally along line 4-4 of FIG. 3.

With reference to FIGS. 3 and 4, another embodiment of a hose 100 is illustrated. For ease of understanding, like reference numerals in FIGS. 3 and 4 refer to like features in FIGS. 1-2. In this regard, the description and function of these like features in FIGS. 1-2 may be referred to for an understanding of like features in FIGS. 3 and 4. Hose 100 includes an inner core layer 12 defining a lumen 13, an outer layer 30, and a single reinforcing layer 114 disposed between inner core layer 12 and outer layer 30. Single reinforcing layer 114 is formed from first and second reinforcing members 16, 18 similar to those described with reference to hose 10 of FIGS. 1-2. In this illustrative embodiment, the first and second reinforcing members 16, 18 are braided in a pattern such that each first reinforcing member 16 crosses over a set of three oppositely wound set of second reinforcing members 18, and then passes under an adjacent set of three oppositely wound reinforcing members 18 in succession. This braid pattern is referred to herein as a 3-over, 3-under braid pattern.

Figure 3A:
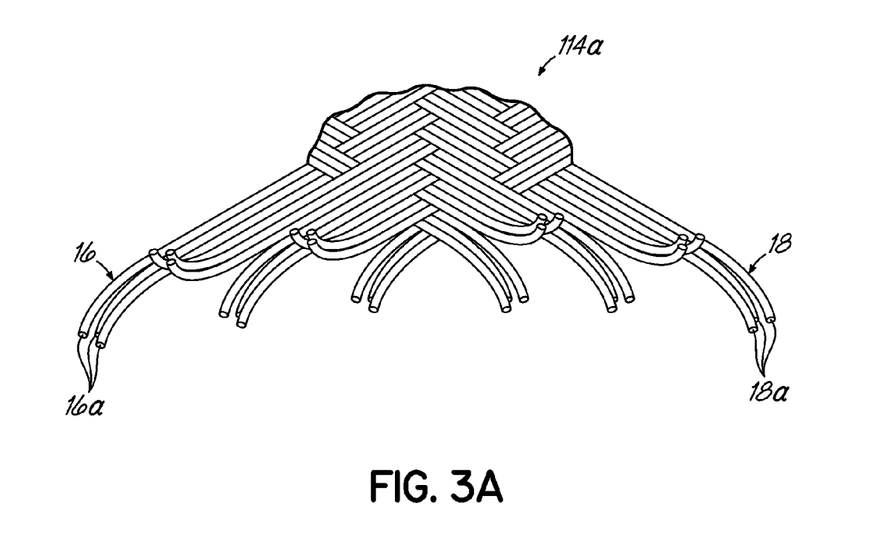
FIG. 3A is a perspective view of a portion of an exemplary embodiment of a reinforcing layer different from that of the hose of FIG. 3.

With reference to FIG. 3A, in which like reference numerals refer to like features in FIGS. 3-4, an exemplary embodiment of a single reinforcing layer 114a is formed from first and second reinforcing members 16, 18 each in turn formed from a group or bundle of individual threads or filaments. More specifically, in the illustrative embodiment of FIG. 3A, the first and second reinforcing members are respectively formed from bundles of individual threads or filaments 16a and 18a. Each of the first and second reinforcing members 16, 18 is braided, in this embodiment, in a 3-over, 3-under braid pattern.

Figure 4A:
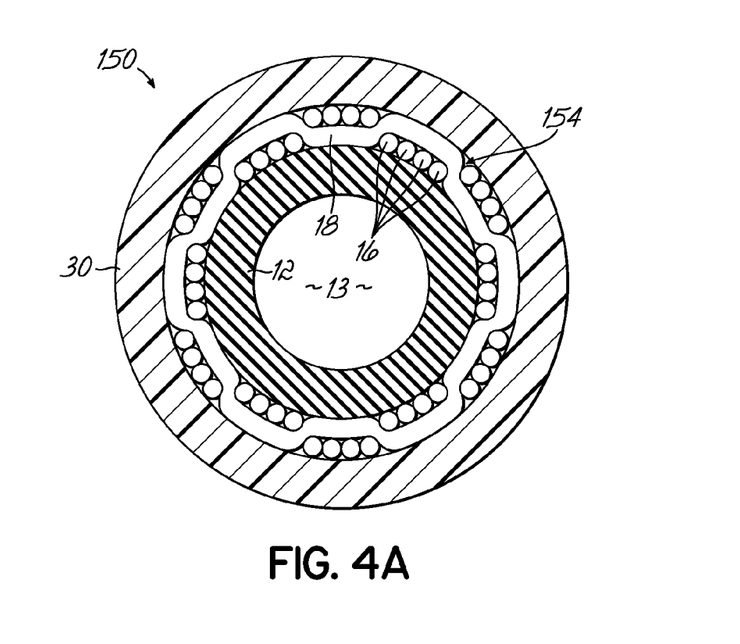
FIG. 4A is a view similar to FIG. 4 showing a different embodiment og a hose.

With reference to FIG. 4A, another embodiment of a hose 150 is illustrated. For ease of understanding, like reference numerals in FIG. 4A refer to like features in FIG. 4. In this regard, the description and function of these like features in FIG. 4 may be referred to for an understanding of like features in FIG. 4A. Hose 150 includes an inner core layer 12 defining a lumen 13, an outer layer 30, and a single reinforcing layer 154 disposed between inner core layer 12 and outer layer 30. Single reinforcing layer 154 is formed from first and second reinforcing members 16, 18 similar to those described with reference to hose 100 of FIG. 4. In this illustrative embodiment, the first and second reinforcing members 16, 18 are braided in a pattern such that each first reinforcing member 16 crosses over a set of four oppositely wound set of second reinforcing members 18, and then passes under an adjacent set of four oppositely wound reinforcing members 18 in succession. This braid pattern is referred to herein as a 4-over, 4-under braid pattern. Each of the reinforcing members 16, 18 of this embodiment may further be formed from bundles of individual threads or filaments, as discussed, for example, with reference to the embodiment of FIG. 3A.

Figure 5:
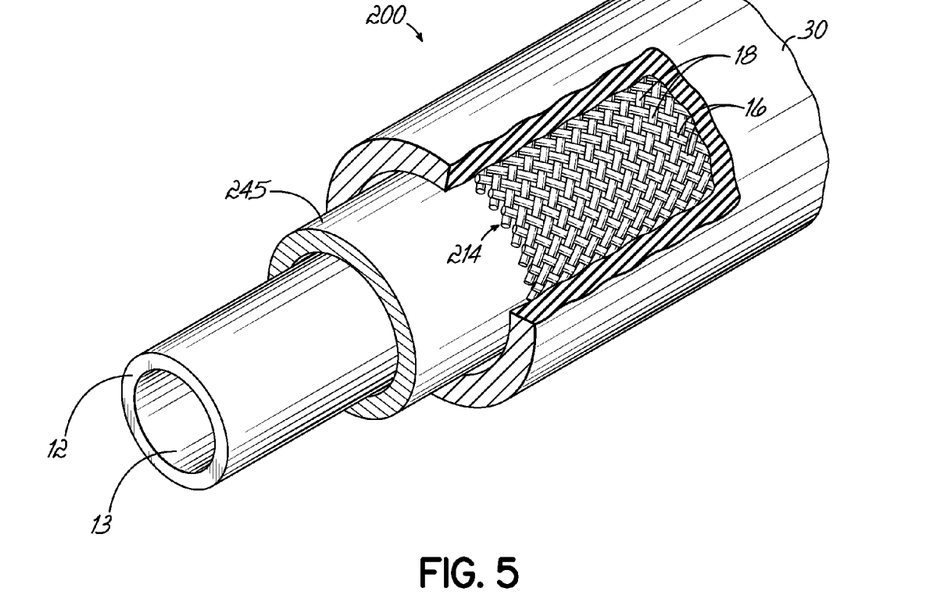
FIG. 5 is a partially broken away perspective view of another embodiment of a hose.

With reference to FIG. 5, another embodiment of a hose 200 is illustrated. For ease of understanding, like reference numerals in FIG. 5 refer to like features in FIGS. 1-2. In this regard, the description and function of these like features in FIGS. 1-2 may be referred to for an understanding of like features in FIG. 5. Hose 200 includes an inner core layer 12 defining a lumen 13, an outer layer 30, and a single reinforcing layer 214 disposed between inner core layer 12 and outer layer 30. Single reinforcing layer 214 is formed from first and second reinforcing members 16, 18 similar to those described with reference to hose 10 of FIGS. 1-2. Single reinforcing layer 214 may include a 1-over, 1-under braid pattern, a 3-over, 3-under braid pattern, or a 4-over, 4-under braid pattern as described above. Moreover, in this exemplary embodiment, the first and second reinforcing members 16, 18 of single reinforcing layer 214 are coated with an adhesive that facilitate coupling of single reinforcing layer 214 with adjacent layers such as outer layer 30. For example, and without limitation, the first and second reinforcing members 16, 18 may be coated with a resorcinol formaldehyde latex adhesive or an isocyanate adhesive.

Hose 200 includes an intermediate layer 245 disposed between the inner core layer 12 and the single reinforcing layer 214. In this regard, the adhesive discussed above may additionally or alternatively facilitate adhesion of single reinforcing layer 214 to intermediate layer 245. In this specific embodiment, intermediate layer 245 is made of a bromobutyl rubber material extruded over the inner core layer 12. Alternatively, the intermediate layer 245 may be made of any of the materials discussed above defining the inner core layer 12 or the outer layer 30. The thickness of intermediate layer 245 is suitably chosen for a specific application. For example, and without limitation, intermediate layer 245 may have a thickness in the range from about 0.76 mm to about 1.0 mm.

Figure 6:
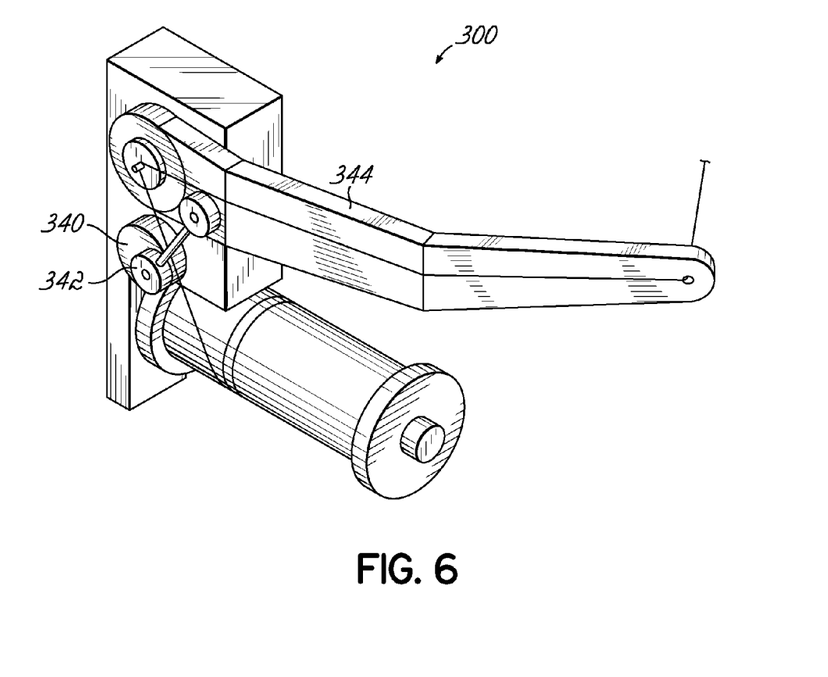
FIG. 6 is a perspective view illustrating a portion of an exemplary rotary braiding machine.

With reference to FIG. 6, a portion of an exemplary rotary braiding machine 300 is illustrated for forming any of the single reinforcing layers 14, 114, 114a or 214 discussed above. Details of the exemplary rotary braiding machine 300 are described in U.S. Pat. No. 5,099,744, the disclosure of which is incorporated by reference herein in its entirety. A cam 340 and cam follower 342 of the rotary braiding machine 300 control the motion of a pivotable arm 344 such that an end of the arm moves up and down to form the over-under patterns in the braid. To create the varied braid patterns, a small cam can be substituted for cam 340 when it is desired to form a 1-over, 1-under pattern. Similarly, a larger cam may be substituted when it is desired to form a 3-over, 3-under braid pattern or 4-over, 4-under braid pattern. Accordingly, the cams are relatively easily changed to alter the braid pattern formed by the machine, whereby the same machine may be utilized to create various braid patterns as discussed above.

Referring again to the exemplary hoses of FIGS. 1-5, and more particularly to the single reinforcing layers 14, 114, 114a, 214 of the respective embodiments shown in the figures, the particular braid pattern may be selected to optimize various properties of the hoses 10, 100, 150, 200. For example, the chosen braid pattern may control the resulting burst strength, volumetric expansion, rubber bleed-through during formation, dynamic life, vibration, and/or coupleability to adjacent layers. Moreover, the chosen pattern may determine the overall outer diameter of the hose.

EXAMPLE 1

In one specific example, a hose ("the test hose") was built for and air conditioning application, with a construction similar to that of exemplary hose 200 of FIG. 5, using a single reinforcement layer having a 1-over, 1-under braid pattern. The strands of the reinforcement members were formed from polyethylene terephthalate (PET) and had denier values of about 1500. The braid pattern was formed using 4 ends with 24 carriers of a rotary braiding machine, to yield a total reinforcement denier value of about 144,000. The inner core layer was formed of nylon, the intermediate layer was formed from chlorobutyl rubber (CIIR), and the outer layer was formed from ethylene-propylene diene monomer (EPDM). The resulting outer diameter of the test hose was about 19 mm.

A conventional hose with a similar construction ("the conventional hose") was also tested, having the same materials and dimensions, except for the single reinforcement layer having a 2-over, 2-under braid pattern formed from strands having denier values of about 2000. The single reinforcement layer of the conventional hose was formed using 4 ends with 36 carriers of a rotary braiding machine, to yield a total reinforcement denier value of about 288,000. The conventional hose is known as model GY-4870 and is available from Veyance Technologies, Inc. of Fairlawn, Ohio. The outer diameter of the conventional hose was larger in comparison, more specifically about 19.8 mm.

A series of tests were performed on the test hose and the conventional hose described above. One such test compared the flexibility of the test hose with that of the conventional hose. This test measured the force required to bend each of the hoses around a semi-circular shape guide or surface having a radius of about 90 mm. A generally straight piece of the hose having a length of about 380 mm was held in place tangent to the curvature of the semi-circular guide. A force measurement gauge was attached to the free end of the hose at a distance of about 320 mm from the fixed end. The hose was then pulled around the semi circular guide using the force gage until the hose had been bent about 180° from its initial position. The ultimate force required to bend each of the hoses around the semi-circular guide was recorded.

This test was conducted on each hose both along the natural curvature of the hose, and against the natural curvature of the hose. The force values for the test hose and the conventional hose when bent with the natural curvature ("with the curve") and against the natural curvature ("against the curve") were recorded and compared. In assessing the recorded values, a lower bending force value was associated with a more flexible hose, which may be desirable for particular applications. The table below summarizes the results of this test.

| Property | Conventional Hose | Test Hose |
| --- | --- | --- |
| Flexibility - Force to bend hose R90 | 1.5 kg with curve<br>2.0 kg against curve | 0.65 kg with curve<br>1.2 kg against curve |

As seen on the above table, the test hose had greater flexibility both when bent "with the curve," and when bent "against the curve" relative to the conventional hose.

Figure 7:
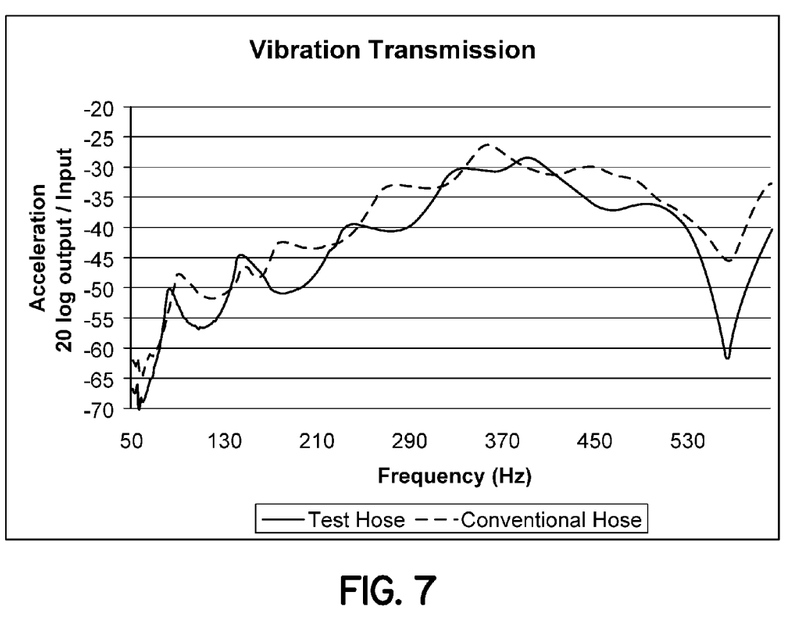
FIG. 7 is a graphical representation of a performance parameter of an exemplary embodiment of a hose.

With reference to FIG. 7, another test was performed to compare the relative vibration transmission response of the test hose to that of the conventional hose. A straight length of hose was placed in a horizontal orientation and attached at one end to an excitation device capable of generating an input acceleration of up to about 3G in a direction generally perpendicular to the hose. The opposite end of the hose was attached to a fixture that was mounted to a solid surface. A single axis accelerometer was attached to the hose surface at both ends to measure the input acceleration and the output acceleration that passed through the hose during the test.

A constant acceleration of about 1G was established as the input and the test was conducted over a frequency range from about 0 to about 600 Hz. Data was collected by the accelerometer during the entire frequency sweep and fed into an oscilloscope. The ratio of the output to input acceleration was then plotted on a graph as the ordinate and the frequency was plotted as the abscissa. The amplitudes of the various nodes on the graphs were then compared for the two hoses (the test hose and the conventional hose) to determine the relative amount of vibration that was transmitted through each of the hoses. The results of this test are depicted in FIG. 7 as a graph.

As the graph shows, the output response for the test hose was similar to that of the conventional hose along the entire frequency tested. Moreover, the output response was such that the level of vibration for the test hose was lower (i.e., more desirable) than that associated with the conventional hose at many frequencies in the tested range.

EXAMPLE 2

A second hose ("the second test hose"), a third hose ("the third test hose"), and a fourth hose ("the fourth hose") each having a single reinforcing layer formed from a 3-over, 3-under braid pattern, were tested. The second test and third test hoses had an internal diameter of about ¼ inch (about 6.35 mm) while the fourth test hose had an internal diameter of about 3/16 inch (about 4.76 mm). A series of tests were conducted according to SAE J1401, section 4.2.3 standards on the second, third, and fourth test hoses. To this end, each of the second, third, and fourth test hoses was mounted vertically between two fittings on a testing apparatus. The testing apparatus placed one end of the hose in selective fluid communication (by a valve) with a source of testing fluid for applying pressures and the other end of the hose in selective fluid communication (by a valve) with a graduated buret for measuring volumes of liquid.

After allowing the testing fluid to flow through the lumen of the hose and into the buret to bleed air from the system, the valve to the buret was closed and about 20.0 MPa (2900 psi) was applied to the hose using the testing fluid. The pressure in the hose was then released and the fluid level in the buret was adjusted to about zero. Next, with the valve to the buret closed, about 6.9 MPa (about 1000 psi) was applied to the hose. The hose was then sealed off from the source of testing fluid within about 2 to about 8 seconds. Then, within about 3 seconds, the valve to the buret was opened for about 10 to about 13 seconds to allow the testing fluid in the expanded hose to rise into the buret. These steps were repeated twice for each of the second, third, and fourth test hoses so that the amount of testing fluid in the buret was the total of the three expansions for each of the test hoses. The volume of the testing fluid in the buret was then used to determine the volumetric expansion at 6.9 MPa (1000 psi).

The above procedure was repeated for each of the second, third, and fourth test hoses to obtain the respective volumetric expansion at pressures of about 10.3 MPa (1500 psi) and about 20.0 MPa (2900 psi). Additionally, for comparison, the test procedure was conducted on a three control hydraulic brake hoses. The first and second control brake hoses ("control a" and "control b") each had a construction and inner diameter similar to the second test hose (i.e., about ¼ inch). The third control brake hose ("control c") had a construction and inner diameter similar to the third test hose (i.e., about 3/16 inch). Each of the control hydraulic brake hoses (i.e., control a, control b, and control c) had a single reinforcing layer formed from a conventional 2-over, 2-under braid pattern. As seen from tables 1-3 below, the second, third, and fourth test hoses were found to have lower levels of volumetric expansion respectively relative to a corresponding control hydraulic brake hose having the same inner diameter.

TABLE 1

Results from SAE J1401, Section 4.2.3 Tests - Second Test Hose

| Pressure (psi) | Control a ¼ inch Inner Dia. Vol. Expansion (cc/ft) | Second Test Hose ¼ Inner Dia. Vol. Expansion (cc/ft) |
| --- | --- | --- |
| 1000 | 0.20 | 0.13 |
| 1500 | 0.28 | 0.18 |
| 2900 | 0.50 | 0.29 |

TABLE 2

Results from SAE J1401, Section 4.2.3 Tests - Third Test Hose

| Pressure (psi) | Control b ¼ inch Inner Dia. Vol. Expansion (cc/ft) | Third Test Hose ¼ Inner Dia. Vol. Expansion (cc/ft) |
| --- | --- | --- |
| 1000 | 0.13 | 0.10 |
| 1500 | 0.17 | 0.12 |
| 2900 | 0.27 | 0.22 |

TABLE 3

Results from SAE J1401, Section 4.2.3 Tests - Fourth Test Hose

| Pressure (psi) | Control c 3/16 inch Inner Dia. Vol. Expansion (cc/ft) | Fourth Test Hose 3/16 Inner Dia. Vol. Expansion (cc/ft) |
| --- | --- | --- |
| 1000 | 0.24 | 0.11 |
| 1500 | 0.33 | 0.16 |
| 2900 | 0.57 | 0.26 |

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A hose comprising:
   a tubular inner core layer defining a lumen with a diameter of about ¼ inch;
   a tubular outer layer; and,
   a single reinforcing layer disposed between said tubular inner core layer and said tubular outer layer, said single reinforcing layer formed of strands having a 3-over, 3-under braid pattern, said hose having a volumetric expansion not greater than about 0.13 cc/ft, not greater than about 0.18 cc/ft, and not greater than about 0.29 cc/ft, respectively with about 1000 psi, about 1500 psi, and about 2900 psi of fluid pressure within said lumen.

2. A hose comprising:

a tubular inner core layer defining a lumen with a diameter of about 3/16 inch;

a tubular outer layer; and, a single reinforcing layer disposed between said tubular inner core layer and said tubular outer layer, said single reinforcing layer formed of strands having a 3-over, 3-under braid pattern, said hose having a volumetric expansion not greater than about 0.10 cc/ft, not greater than about 0.12 cc/ft, and not greater than about 0.22 cc/ft, respectively with about 1000 psi, about 1500 psi, and about 2900 psi of fluid pressure within said lumen.

* * * * *